United States Patent [19]
Henrick

[11] 3,818,047
[45] June 18, 1974

[54] SUBSTITUTED PYRONES
[76] Inventor: Clive A. Henrick, Palo Alto, Calif.
[22] Filed: Mar. 12, 1973
[21] Appl. No.: 340,509

Related U.S. Application Data
[63] Continuation-in-part of Ser. No. 278,328, Aug. 7, 1972, Pat. No. 3,773,793.

[52] U.S. Cl. ............................................ 260/343.5
[51] Int. Cl. ............................................. C07d 7/16
[58] Field of Search ................................. 260/343.5

[56] References Cited
UNITED STATES PATENTS
3,248,187  4/1966  Bell .................................. 260/343.5

Primary Examiner—Donald G. Daus
Assistant Examiner—Anne Marie T. Tighe
Attorney, Agent, or Firm—Donald W. Erickson; Lee-Louise H. Priest

[57]  ABSTRACT

Substituted pyrones of the formula

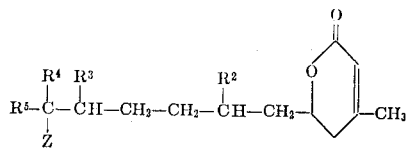

or

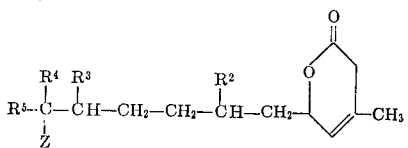

wherein,
$R^2$, $R^4$ and $R^5$ are methyl or ethyl, $R^3$ is hydrogen or methyl, and Z is hydrogen, hydroxy, or alkoxy, are useful in a process for the production of aliphatic 2,4-dienoic acids, esters and thiolesters.

9 Claims, No Drawings

SUBSTITUTED PYRONES

This is a continuation-in-part of application Ser. No. 278,328, filed Aug. 7, 1972 now U.S. Pat. No. 3,773,793, issued Nov. 20, 1973.

This invention relates to the syntheses of aliphatic 2,4-dienoic acids, esters thereof, thiolesters thereof, intermediates therefor, and the control of insects.

The syntheses of the present invention are directed to the production of aliphatic 2,4-dienoic acids, esters and thiolesters of formula A.

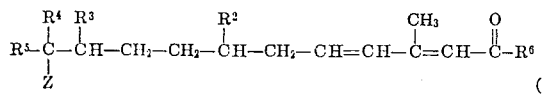

(A)

wherein,
each of $R^2$, $R^4$ and $R^5$ is methyl or ethyl;
$R^3$ is hydrogen or methyl;
$R^6$ is the group -OR or -SR;
R is hydrogen, lower alkyl, cycloalkyl, lower alkenyl or lower alkynyl; and
Z is hydrogen, hydroxy or lower alkoxy.

The compounds of formula A are useful for the control of insects such as Diptera, Homoptera, Lepidoptera, Coleoptera and Hemiptera. See Chemical & Engineering News, 49, 33, November 29, 1971 and Belgian Patents 778,241 and 778,242 (1972). The more active isomer of the compounds of formula A is the trans-2, trans-4 isomer. A principal advantage of the present invention is the economical and advantageous production of compounds of formula A in which formation of the trans, trans isomer is favored over the cis-2, trans-4 isomer.

Hereinafter, each of R, $R^2$, $R^3$, $R^4$, $R^5$, and $R^6$ and Z is as defined above, unless otherwise specified.

Briefly stated, the syntheses of the present invention comprises the condensation of an aldehyde such as dihydrocitronellal with an ester of beta-methylglutaconic acid resulting in a 1,5-diacid, decarboxylation of the 1,5-diacid to the C-1 acid which is essentially all cis-2, trans-4 acid and conversion thereof into trans-2, trans-4 acid or ester.

The syntheses of the present invention is outlined as follows (R' is lower alkyl and M is sodium or potassium):

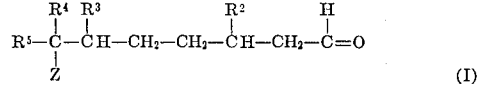

(I)

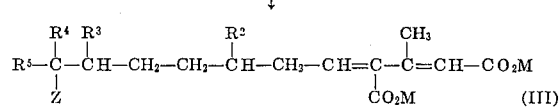

(III)

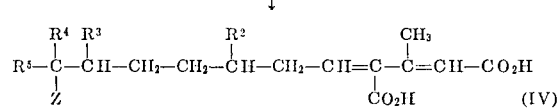

(IV)

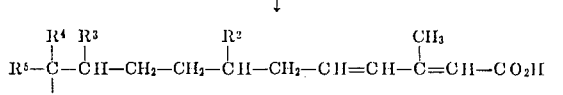

(V)

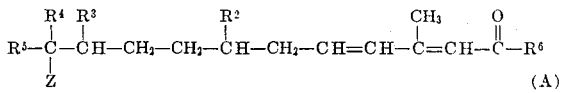

(A)

In the practice of the above outlined syntheses, an aldehyde of formula I is condensed with a lower alkyl ester of beta-methylglutaconic acid of formula II to yield the diacid salt (III). The condensation is conducted

(II)

using about a one to one mole ratio of the aldehyde (I) and ester (II) and about two to six equivalents of a base such as sodium hydroxide or potassium hydroxide in a lower monohydric alcohol solvent such as methanol or ethanol. The order of addition of the reactants does not appear to be important. The reaction temperature can range from room temperature to the reflux temperature of the reaction mixture. The reaction time which will vary with the temperature is from about 1 hour to 48 hours. A mixed ester of formula II can be used as well-i.e., R' represents different lower alkyl radicals. In place of the diester II, there can be used lower alkyl isodehydroacetate such as methyl or ethyl isodehydroacetate in the condensation reaction with aldehyde I to form the di-salt III. On completion of the condensation, the reaction product can be washed with an organic solvent such as hydrocarbon, ether or alcohol solvent, e.g., pentane, hexane or ether. The diacid salt (III) is then dissolved or suspended in water or aqueous organic solvent medium and the solution adjusted to an acidic pH such as about pH 2 to 4 using an inorganic or organic acid to yield the free diacid (IV). The diacid (IV) goes into the organic phase upon acidification of the aqueous organic solvent medium. Alternatively, after acidification of a water solution of III, extraction with an organic solvent removes the free acid (IV). The diacid (IV) is essentially exclusively cis at C-2,3 while configuration at C-4,5 is uncertain. Suitable organic solvents include the ethers and hydrocarbons, for example, diethyl ether, toluene, and the like. Either an inorganic or organic acid or a reagent capable of releasing acid can be used for acidification. Suitable agents for acidification include, for example, sulfuric acid, hydrochloric acid, phosphoric acid and acetic acid.

The diacid (IV) is then decarboxylated to the C-1 monoacid (V) which is essentially exclusive cis-2, trans-4. The decarboxylation is conducted with heating in a tertiary organic amine in the presence or absence of a copper salt or metallic copper. Suitable amines include 2,4-dimethylpyridine, 2,4,6-trimethylpyridine, pyridine, and the like. Suitable copper salts include copper diacetate, copper sulfate, copper oxide, copper chromite, cuprous acetate, cuprous oxide, and the like. Organic solvent inert to the reaction can be added such as a hydrocarbon solvent along with the amine and copper salt. The reaction appears to begin at about 80°C at which time carbon dioxide is given off and is completed at about 110°C to 120°C to form the cis-2, trans-4 mono-acid (V). One or both of the intermediate lactones VI and VII may be present in the reaction product of the decarboxylation of the diacid IV depending upon reaction temperature, reaction time, presence or absence of copper, and the amount of amine as will be apparent from the examples hereinafter. Any unconverted lactone VI and VII can be recycled or treated separately by heating with organic amine or other base such as 2,4-lutidine, pyridine, sodium ethoxide, sodium methoxide, and the like to the acid (V). The presence of a tertiary amine and/or copper is not essential in the decarboxylation step as is demonstrated hereinafter.

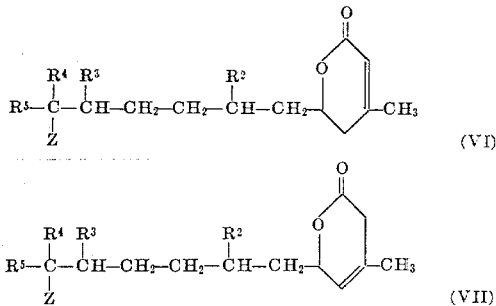

The conversion of the diacid IV to the mono-acid V can be carried out, as well, in two steps, by deliberate decarboxylation of IV to the lactone VII using an organic amine such as pyridine or 2,4-lutidine. The reaction is usually done in an organic solvent such as the ethers or hydrocarbons and heating at about 100° until evolution of carbon dioxide ceases. The lactone VII is then readily opened to the mono-acid V by treatment with base such as an alkali alkoxide in alcohol or alcohol plus hydrocarbon solvent such as toluene. Suitable bases include sodium ethoxide and sodium methoxide. The latter reaction proceeds at room temperature satisfactorily, although higher temperatures can be used.

The diacid IV on standing will form an acid lactone of the formula VIII

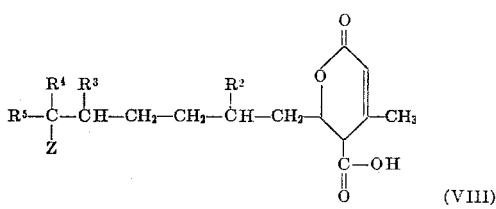

and, without any intentions of being bound by theory, is probably formed during the decarboxylation of the diacid IV to the mono-acid V. The acid lactone VIII is readily converted into the monoacid V as demonstrated hereinafter.

The cis-2, trans-4 mono-acid V is then isomerized to a mixture of trans-2, trans-4 and cis-2, trans-4 by treatment with isomerzation catalysts such as diphenyldisulfide, thioacetic acid, phenyl mercaptan (thiophenol), and the like in the presence or absence of a free radical initiator such as 2,2'-azobis-(isobutyronitrile). An equilibrium mixture is achieved of the order of 60%–65% trans-2, trans-4 and 40%–35% cis-2, trans-4. The isomeric mixture is then esterified or thiolesterified to prepare the useful esters and thiolesters of formula A. One suitable method is to treat the acid with thionyl chloride to form the acid chloride which is then reacted with an alcohol of formula R-OH such as isopropanol, ethanol, n-propanol, cyclopropyl alcohol, propargyl alcohol or 2-propen-1-ol according to the ester moiety desired or with a mercaptan of the formula R-SH according to the thiolester moiety desired.

Alternatively, the cis-2, trans-4 acid V can be esterified first and then isomerized using, e.g., elemental sulfur, sodium sulfide, lithium, potassium or sodium salt of methylmercaptan or sodium hydrogen sulfide to prepare a mixture of the trans-2, trans-4 and cis-2, trans-4 isomers of formula A.

Following isomerization of the acid V to an equilibrium mixture (about 65% trans, trans and about 35% cis, trans), pure trans, trans acid V can be isolated by formation of the ammonium salt by introducing ammonia into a solution of the isomeric mixture of the acid V in diethyl ether, dichloromethane, chloroform or hexane. The precipitated salt of the trans, trans isomer can be filtered off and the cis-2, trans-4 isomer can be recovered from the filtrate and recycled in the above described isomerization, if desired.

The term "lower alkyl", as used herein, refers to a straight or branched chain saturated aliphatic hydrocarbon group having a chain length of one to six carbon atoms, e.g., methyl, ethyl, propyl, i-propyl, n-butyl, s-butyl, t-butyl, pentyl and hexyl.

The term "lower alkoxy", as used herein, refers to lower alkoxy group of one to six carbon atoms such as methoxy, ethoxy, isopropoxy, t-butoxy and n-propoxy.

The term "cycloalkyl", as used herein, refers to a cyclic alkyl group containing three to eight carbon atoms, e.g., cyclopropyl, cyclopentyl and cyclohexyl.

The term "lower alkenyl", as used herein, refers to an ethylenically unsaturated hydrocarbon group, branched or straight chain, having a chain length of two to six carbon atoms, e.g., allyl, vinyl, 3-butenyl, 2-hexenyl and 1-propenyl.

The term "lower alkynyl", as used herein, refers to an acetylenically unsaturated hydrocarbon group, branched or straight chain, having a chain length of two to six carbon atoms, e.g., ethynyl, 2-propynyl, 3-pentynyl.

The following examples are provided to illustrate the practice of the present invention. Temperature is given in degrees Centigrade.

EXAMPLE 1

To a mixture of 25 g. of dimethyl β-methylglutaconate, 25 g. of 7-hydroxy-3,7-dimethyloctan-1-al, and about 20 ml. of methanol is added 18 g. of sodium hydroxide partially dissolved in 35 ml. of methanol. The reaction is stirred at gentle reflux for 1.5 hours, under nitrogen. A thick slurry is formed which is cooled to about 9°, filtered and washed with ether to yield the disodium salt (III; each of $R^2$, $R^4$ and $R^5$ is methyl, $R^3$ is hydrogen, Z is hydroxy and M is sodium).

About 3 g. of the disodium salt in water is acidified by addition of sulfuric acid (3N) with stirring. The mixture is extracted with ether (3X), washed with water and saturated sodium chloride, and put under vacuum to yield the free diacid (IV; each of $R^2$, $R^4$ and $R^5$ is methyl, $R^3$ is hydrogen, Z is hydroxy), pale yellow crystals.

To 1.2 g. of the diacid in 2.8 g. of lutidine (2,4-dimethylpyridine), under nitrogen, is added 23.6 mg. of copper diacetate monohydrate. The reaction mixture is slowly heated up to about 120°–145° and then heated at about 130° for 20 minutes. The reaction is worked up by cooling and adding to 100 ml. of ether and 75 ml.

of water. Sulfuric acid (2N) is added to adjust to about pH one and then extracted with ether. Ether phase is washed with saturated copper sulfate solution, water and saturated NaCl, dried over calcium sulfate, filtered and filtrate evaporated to yield 11-hydroxy-3,7,11-trimethyl-2,4-dodecadienoic acid (V; each of $R^2$, $R^4$ and $R^5$ is methyl, $R^3$ is hydrogen, Z is hydroxy), essentially all cis-2, trans-4, colorless, rather viscous oil.

To 100 mg. of the above mono-acid in 2.5 ml. of ether, under nitrogen, at room temperature is added about 0.79 millimole of 1-ethyl-3-p-tolyltriazene in 2.5 ml. of ether. The reaction is heated to reflux for 4 hours and then cooled. The reaction is worked up by washing with ice water, aqueous dilute HCl, aqueous sodium bicarbonate and saturated NaCl, dried over calcium sulfate, filtered and filtrate evaporated to remove solvent to yield ethyl 11-hydroxy-3,7,11-trimethyl-2,4-dodecadienoate as a mixture of 96.3% cis-2, trans-4 and 3.7% trans-2, trans-4 isomers.

EXAMPLE 2

To a mixture of 1.0 g. of diethyl beta-methylglutaconate, 0.78 g. of 7-methoxy-3,7-dimethyloctan-1-al and 0.5 ml. of methanol, at 24° under nitrogen, is added a mixture of 1.12 g. of potassium hydroxide and 6 ml. of methanol. The mixture is stirred at room temperature for 20 hours, cooled to 0° and filtered to yield the dipotassium salt (III; each of $R^2$, $R^4$ and $R^5$ is methyl, $R^3$ is hydrogen, Z is methoxy, M is potassium), cream-colored dry solid. The dipotassium salt is dissolved in 4 ml. of water which is acidified (pH 2) with 3N sulfuric acid and extracted with ether. The ether phase is washed with water and saturated NaCl, dried over calcium sulfate and solvent evaporated to yield the diacid (IV; each of $R^2$, $R^4$ and $R^5$ is methyl, $R^3$ is hydrogen, Z is methoxy), very viscous, light yellow-liquid.

A mixture of 0.47 g. of the above diacid, 1.55 g. of 2,4-lutidine and 8 mg. of copper diacetate powder is heated to 120° for 30 minutes. The mixture is cooled and 50 ml. of ether and 25 ml. of water added. The pH of the mixture is brought to zero with 3N sulfuric acid. The aqueous phase is separated and extracted twice with 25 ml. portions of ether. The combined ether layers are washed twice with 10 ml. portions of saturated aqueous copper sulfate, twice with 10 ml. portions of water, and once with 10 ml. of saturated aqueous NaCl, dried over calcium sulfate and solvent evaporated to yield 11-methoxy-3,7,11-trimethyl-2,4-dodecadienoic acid, pale yellow liquid, consisting almost entirely of the cis-2, trans-4 isomer.

EXAMPLE 3

A mixture of 0.34 g. of 11-methoxy-3,7,11-trimethyl-cis-2, trans-4-dodecadienoic acid, 0.19 ml. of thionyl chloride, and 3 ml. of ether is heated at 35°, under nitrogen, in a water bath, for 1 hour. Then, the mixture is concentrated by evaporation to remove volatile materials. To the concentrate is added 2 ml. of ether and 0.16 ml. of isopropanol at 0°. The mixture is allowed to warm to room temperature and then 50 ml. of ether and 50 ml. of water are added. The ether layer is separated, washed twice with 10 ml. portions of water and once with 10 ml. of saturated aqueous NaCl, dried over calcium sulfate, and evaporated to yield isopropyl 11-methoxy-3,7,11-trimethyl-2-cis, 4-trans-dodecadienoate, pale yellow liquid.

EXAMPLE 4

Following the procedure of Example 2, 1.51 g. of the diacid (IV; each of $R^2$, $R^4$ and $R^5$ is methyl, $R^3$ is hydrogen, Z is methoxy) is decarboxylated using 25.2 mg. of copper diacetate and 4.72 g. of 2,4-lutidine and heating at 80°–120° for 30 minutes to yield 1.08 g. (84 percent yield) of 11-methoxy-3,7,11-trimethyl-cis-2, trans-4-dodecadienoic acid, pale yellow liquid.

EXAMPLE 5

To a mixture of 0.5 g. of diacid (IV: Z is hydrogen, each of $R^2$, $R^4$ and $R^5$ is methyl, $R^3$ is hydrogen) and 3 ml. of toluene is added 10 mg. of cuprous oxide powder. The mixture is heated on an oil bath slowly up to about 96° for 2.8 hours. Then 21 mg. of collidine is added and heating continued for 0.7 hour. Heat is removed and after cooling, the reaction is filtered. The filtrate is added to water and acidified to about pH one using 4N sulfuric acid. The phases are separated and the aqueous phase extracted with ether. The combined organic phases are washed with water and brine, dried over Drierite, filtered and the filtrate concentrated to yield mostly the lactone (VII; each of $R^2$, $R^4$ and $R^5$ is methyl, $R^3$ is hydrogen, Z is hydrogen) and a small amount of 3,7,11-trimethyl-2,4-dodecadienoic acid (essentially all cis 2, trans 4) which are separated by thin layer chromatography using ether/hexane (7/3).

EXAMPLE 6

A mixture of 0.7 g. of diacid (IV; each of $R^2$, $R^4$ and $R^5$ is methyl, $R^3$ is hydrogen, Z is hydrogen), 25 mg. of cupric acetate monohydrate and 3 ml. of 2,4-lutidine, under nitrogen, is heated to 80° and then heat removed when generation of carbon dioxide ceases (about 30 minutes). Mixture is allowed to cool, then poured into water and acidified to about pH one using 4N sulfuric acid. The mixture is extracted with ether (3X). The combined ether extracts are washed with saturated copper sulfate solution, water and brine, dried over calcium sulfate and solvent removed by evaporation to yield a mixture (orange viscous liquid) containing the cis 2, trans 4 acid V (Z is hydrogen, each of $R^2$, $R^4$ and $R^5$ is methyl, $R^3$ is hydrogen), the lactone VII (Z is hydrogen, each of $R^2$, $R^4$ and $R^5$ is methyl, $R^3$ is hydrogen) and the lactone VI (Z is hydrogen, each of $R^2$, $R^4$ and $R^5$ is methyl, $R^3$ is hydrogen) which are separated by preparative thin layer chromatography eluting with ether:hexane (4:6) containing 1 percent formic acid.

EXAMPLE 7

To a mixture of 2.8 g. of 3,7-dimethyloctan-1-al, 2.59 g. of dimethyl beta-methylglutaconate and 5 ml. of dry methanol, under slow nitrogen flow, is added a mixture of 2.4 g. of sodium hydroxide and 20 ml. of dry methanol slowly, with stirring. After addition is complete, the reaction mixture is heated at reflux for about 2.5 hours. Heat is removed and mixture allowed to cool and then filtered to collect the precipitated disodium salt (III; M is sodium, Z is hydrogen, each of $R^2$, $R^4$ and $R^5$ is methyl, $R^3$ is hydrogen) as a fine powder which is washed with ether and then dissolved in water and the solution adjusted to pH one with 4N sulfuric acid. The water is separated off and the residue taken up in ether. The separated water is washed with ether. The combined ether phases are washed with water and brine, dried over calcium sulfate and solid evaporated to yield the diacid (IV; Z is hydrogen, each of $R^2$, $R^4$ and $R^5$ is methyl, $R^3$ is hydrogen) as a very light yellow, thick viscous liquid which solidifies on standing at room temperature, about 75 percent yield.

EXAMPLE 8

To a mixture of 350 g of 7-methoxy-3,7-dimethyloctan-1-al, 325 g of dimethylbeta-methylglutaconate, and 150 ml of dry methanol is slowly added, under a slow nitrogen flow and with stirring, a solution of 267 g of sodium hydroxide pellets in 1000 ml of dry methanol. After addition is complete, the reaction mixture is heated to reflux for about 1 hour and then heat removed and flask cooled in ice water bath. The mixture is filtered and the yellow cake (disodium salt, III; M is sodium, Z is methoxy, $R^3$ is hydrogen, each of $R^2$, $R^4$ and $R^5$ is methyl) is washed with ether or isopropanol and then dissolved in about 1,500 ml of water. The aqueous solution is adjusted to about pH one and then extracted with ether (3X). The combined ether extracts are washed with water and brine, dried over calcium sulfate, filtered and filtrate evaporated to remove solvent to yield the free diacid IV (Z is methoxy, $R^3$ is hydrogen, each of $R^2$, $R^4$ and $R^5$ is methyl), yield about 86.5 percent.

EXAMPLE 9

To a solution of 0.5 g of diacid (IV; Z is hydrogen, $R^3$ is hydrogen, each of $R^2$, $R^4$ and $R^5$ is methyl) and 3 ml of collidine (2,4,6-trimethylpyridine), under nitrogen, is added 11 mg of cupric acetate. The reaction mixture is heated up to 125° over about 0.5 hour and then maintained at 125° for about 0.5 hour. The mixture is allowed to cool, ether added and then poured into water. This mixture is acidfied using 4N sulfuric acid to pH 3,5 and then separated. Aqueous phase is extracted with ether. The combined ether phases are washed with saturated copper sulfate solution, water and brine, dried over calcium sulfate, filtered and filtrate evaporated to remove solvent to yield 3,7,11-trimethyl-2,4-dodecadienoic acid, essentially all cis-2, trans-4, which crystallizes on standing, m.p. 28°–30°.

EXAMPLE 10

A mixture of 1.0 g of methyl 3,7,11-trimethyl-cis-2, trans-4-dodecadienoate and 30 mole percent of sodium sulfide is heated at 114° for 24 hours. After cooling the mixture is diluted with ether and water and separated. The ether layer is washed with water, dried over calcium sulfate, and solvent evaporated to yield methyl 3,7,11-trimethyl-2,4-dodecadienoate, 62.8% trans-2, trans-4 and 37.2% cis-2, trans-4.

The foregoing isomerization is repeated using sodium hydrogen sulfide to yield a mixture of 60.2% trans-2, trans-4 and 39.8% cis-2, trans-4 isomers of methyl 3,7,11-trimethyl-2,4-dodecadienoate.

EXAMPLE 11

A mixture of 250 mg of 11-methoxy-3,7,11-trimethyl-cis-2, trans-4-dodecadienoic acid and 39 mg of diphenyldisulfide is heated at 120° for 8 hours. After cooling, the mixture which is about 60% trans-2, trans-4 isomer and about 40% cis-2, trans-4 isomer of the starting material can be distilled or crystallized at low temperature (about 0°) for purification.

EXAMPLE 12

A. To a solution of 302 g (0.965 mole) of diacid (IV; Z is methoxy, each of $R^2$, $R^4$ and $R^5$ is methyl, $R^3$ is hydrogen) and 2000 ml of dry toluene, under nitrogen, is added 10.3 g (0.0965 mole) of 2,4-lutidine and then 6.71 g of copper diacetate. The reaction is heated up to about 105°–107° which is maintained for about 2 hours and then allowed to cool. The reaction mixture is poured into water and acidified using 4N sulfuric acid. The aqueous phase is extracted with toluene. The combined toluene solutions are then washed with saturated copper sulfate solution, water and brine, dried over calcium sulfate and after one hour the solution is filtered and concentrated under vacuum to give a 93 percent yield of a mixture of the deconjugated lactone (VII; Z is methoxy, $R^3$ is hydrogen, and each of $R^2$, $R^4$ and $R^5$ is methyl) and cis-2, trans-4 acid (V; Z is methoxy, $R^3$ is hydrogen, each of $R^2$, $R^4$ and $R^5$ is methyl) which can be separated by chromatography, if desired.

B. To a solution of 0.28 g of sodium and 10 ml of absolute ethanol, under nitrogen, with stirring, is added 2.64 g of the product from part (A) above in 10 ml of absolute ethanol. The reaction is stirred at room temperature for about 1.5 hours and then heated to reflux for about 4 hours. Heat is removed and the mixture stirred overnight at room temperature. Ethanol is evaporated off. Water is added to the residue and extracted with ether which is dried. The aqueous phase is acidified with 4N sulfuric acid and extracted (2x) with ether. The combined ether solutions are washed with water and brine and dried. The combined ether phases are filtered and concentrated under vacuum to yield 11-methoxy-3,7,11-trimethyl-cis-2, trans-4-dodecadienoic acid, 85 percent yield.

EXAMPLE 13

A mixture of 1.065 g of conjugated lactone (VI; each of Z and $R^3$ is hydrogen, each of $R^2$, $R^4$ and $R^5$ is methyl) and 5 ml of ethanol is added slowly to a solution of sodium ethoxide (0.115 g of sodium and 7.5 ml of ethanol) at 3°–5°, under nitrogen. After addition is complete, the mixture is warmed to room temperature and stirred for about 17 hours. The reaction is worked up by evaporating off the ethanol and adding the residue to ether and water which is acidified with 10% HCl. The aqueous layer is extracted with ether (3x) and the organic layers are combined and washed with water and saturated NaCl solution. Drying over calcium sulfate, filtering and evaporating the solvent gives 3,7,11-trimethyl-cis-2, trans-4-dodecadienoic acid in about 86 percent yield.

EXAMPLE 14

To a mixture of 4.9 g of ethyl isodehydroacetate, 3.9 g of 3,7-dimethyloctan-1-al and about 10 ml of methanol, is slowly added a solution of 5.6 g of KOH and 25 ml of methanol, with cooling. The reaction mixture is stirred overnight. After cooling to about −5° to 0°, the mixture is filtered and the filter cake (III; M is potassium, each of $R^3$ and Z is hydrogen, each of $R^2$, $R^4$ and $R^5$ is methyl) is dissolved in water, acidified to pH one with 4N sulfuric acid and extracted with ether (3x). The combined ether extracts are washed with water, dried over calcium sulfate and evaporated under reduced pressure to yield the diacid (IV; each of Z and $R^3$ is hydrogen, each of $R^2$, $R^4$ and $R^5$ is methyl).

The above process is repeated using an equivalent amount of 7-methoxy-3,7-dimethyloctan-1-al in place of 3,7-dimethyloctan-1-al to yield as the final product the diacid (IV; Z is methoxy, $R^3$ is hydrogen, each of $R^2$, $R^4$ and $R^5$ is methyl).

EXAMPLE 15

To a slurry of 3.56 g (0.01 mole) of disodium salt (III; Z is methoxy, $R^3$ is hydrogen, each of $R^2$, $R^4$ and $R^5$ is methyl, M is sodium) and 50 ml of ether is added 0.54 ml of concentrated sulfuric acid, dropwise. After stirring for 0.75 hour at room temperature, the mixture is filtered to remove the sodium sulfate. After most of the ether is removed at water aspirator pressure, 2.4 ml (0.03 mole) of pyridine is added. The remainder of the ether is removed at water aspirator pressure, and the reaction mixture is heated at 100°, under nitrogen, for 2 hours (after 1 hour carbon dioxide evolution ceases). The pyridine is stripped off the reaction mixture at 0.1 mm Hg. at room temperature over a 2 hour period. The residual oil is taken up in ether and washed with 1.4N sodium hydroxide. The organic phase is separated, dried over magnesium sulfate, filtered and pumped to constant weight. The residue is a mixture of conjugated lactone (VI; Z is methoxy, $R^3$ is hydrogen, each of $R^2$, $R^4$ and $R^5$ is methyl) and deconjugated lactone (VII; Z is methoxy, $R^3$ is hydrogen, each of $R^2$, $R^4$ and $R^5$ is methyl) which can be separated by thin layer chromatography, if desired. The combined aqueous sodium hydroxide washings are acidified to pH one using 3.6N sulfuric acid and extracted (3x) with ether. The ether extracts are combined and dried over magnesium sulfate. Removal of drying agent and ether yields 11-methoxy-3,7,11-trimethyl-cis-2, trans-4-dodecadienoic acid.

EXAMPLE 16

A mixture of 0.01 mole of diacid (IV; Z is methoxy, $R^3$ is hydrogen, each of $R^2$, $R^4$ and $R^5$ is methyl) and 0.03 mole of 2,4-lutidine is heated to 120°, under nitrogen, for 2 hours. The reaction is worked up as described in Example 15 to yield the same deconjugated lactone VII, conjugated lactone VI, and cis-2 trans-4 acid V as in Example 15.

EXAMPLE 17

A. A mixture of 5 g of diacid (IV; Z is methoxy, $R^3$ is hydrogen, each of $R^2$, $R^4$ and $R^5$ is methyl) and 30 ml of dry ether is allowed to stand at room temperature for one month in a stoppered vessel. The ether is evaporated off to yield predominantly the lactone acid of the following formula

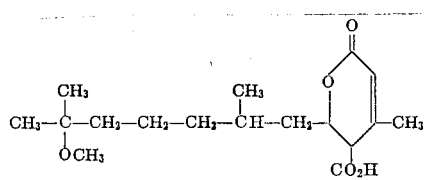

and some of the diacid starting material which can be separated by thin layer chromatography, if desired, or the reaction product used directed for conversion into the cis-2, trans-4 acid V as below.

B. A mixture of about 0.01 mole of the reaction product of part (A) and 0.03 mole of 2,4-lutidine is heated to 120° for 2 hours, under nitrogen. The reaction is then worked up as described in Example 15 to yield the same conjugated lactone VI, deconjugated lactone VII and cis-2, trans-4 acid V as in Example 15.

EXAMPLE 18

A. The process of Example 17 (part A) is repeated using the diacid (IV; each of Z and $R^3$ is hydrogen, each of $R^2$, $R^4$ and $R^5$ is methyl) to yield the following acid lactone

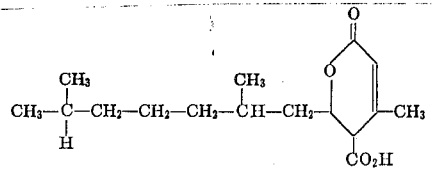

and some of the diacid starting material.

B. The process of part B of Example 17 is repeated using the product of part A of this example as the starting material to yield the conjugated latcone VI, deconjugated lactone VII and cis (2), trans (4) acid V wherein each of Z and $R^3$ is hydrogen and each of $R^2$, $R^4$ and $R^5$ is methyl.

C. The acid lactone of part A of this example can be prepared by an alternative method consisting of heating the diacid IV (Z is hydrogen) in acetone in the presence of 50 percent aqueous sulfuric acid according to the procedure of Wiley and Ellert, J. Am. Chem. Soc. 79, 2266 (1957).

EXAMPLE 19

To 3.56 g (0.01 mole) of disodium salt (III; Z is methoxy, M is sodium, $R^3$ is hydrogen, each of $R^2$, $R^4$ and $R^5$ is methyl) in 20 ml of water is added 2.77 ml of 3.6N sulfuric acid. The pH of the resulting solution is 6.5. The solution is refluxed for 7 hours, after which time the pH is 8.5. After standing overnight at room temperature, the mixture is made more basic by addition of 2N sodium hydroxide and then extracted with ether. The ether extracts are combined, dried over magnesium sulfate and filtered. Removal of solvent yields a colorless oil which is a mixture of about 55:45 of 10-methoxy-2,6,10-trimethyl-undeca-1,4-diene and the conjugated lactone (VI; Z is methoxy, $R^3$ is hydrogen, each of $R^2$, $R^4$ and $R^5$ is methyl) which can be separated by thin layer chromatography. The aqueous phase is acidified with 3.6N sulfuric acid and extracted (3x) with ether. The extracts are combined, dried over magnesium sulfate, filtered and solvent stripped off. The residue is about a 2:1 mixture of 11-methoxy-3,7,11-trimethyl-cis-2, trans-4-dodecadienoic acid and 4-carboxy-11-methoxy-3,7,11-trimethy-cis-2,4-dodecadienoic acid which can be separated by thin layer chromatography.

EXAMPLE 20

To 2.005 g of 11-methoxy-3,7,11-trimethyl-cis-2, trans-4-dodecadienoic acid in a vial with a serum cap is added 44.4 mg of thiophenol and 13 mg of 2,2'-azobis (isobutyronitrile). The reaction mixture is heated to 80° for 2 hours. After cooling, the reaction mixture is dissolved in 3 ml of dry ether and then distilled thionyl chloride (1.07 ml) in 17 ml of dry ether is added slowly at room temperature under nitrogen. The mixture is heated for 3 hours at 35°. Then, the ether is evaporated and fresh dry ether (20 ml) added to the residue (acid chloride mixture) which is cooled to about 1°, under nitrogen. A mixture of 1.7 ml of dry isopropanol and 5 ml of ether is added and the resulting reaction mixture stirred at about 2° for 0.5 hour and then warmed to room temperature and stirred for about 16 hours. Solvent and excess isopropanol is evaporated off yielding isopropyl-11-methoxy-3,7,11-trimethyl-2,4-dodecadienoate having an isomer ratio of 67.6% trans-2, trans-4 and 32.4% cis-2, trans-4.

EXAMPLE 21

To 2.0155 g of 11-methoxy-3,7,11-trimethyl-cis-2, trans-4-dodecadienoic acid is added 136.5 mg of thioacetic acid in a vial fitted with s serum cap. The reaction mixture is heated at 120° for 6 hours. After cooling, the thus-prepared equilibrium mixture of the acid isomers is converted to the acid chloride and then to the isopropyl ester as in Example 20 to yield an isomeric mixture of 64.3% trans-2, trans-4 and 35.7% cis-2, trans-4 isopropyl 11-methoxy-3,7,11-trimethyl-2,4-dodecadienoate.

EXAMPLE 22

To a solution of 12.95 g (0.0414 mole) of diacid (IV; Z is methoxy, each of $R^2$, $R^4$ and $R^5$ is methyl, $R^3$ is hydrogen) in 80 ml of toluene, under nitrogen, is added 0.44 g (0.00414 moles) of 2,4-dimethylpyridine. The mixture is stirred and heated to 100°. Carbon dioxide evolution begins at about 80° and the heating at 100° is continued until evolution ceases or about 90 minutes. The toluene and 2,4-dimethylpyridine are then removed in vacuo to give a residue consisting mainly of lactone VII (Z is methoxy, each of $R^2$, $R^4$ and $R^5$ is methyl, $R^3$ is hydrogen) with small amount of the acid V and lactone VI.

EXAMPLE 23

To a solution of 23 g of sodium in one liter of absolute ethanol is added a solution of 219.3 g (0.83 moles) of lactone VII (Z is methoxy, each of $R^2$, $R^4$ and $R^5$ is methyl, $R^3$ is hydrogen) in 400 ml of toluene. The reaction mixture is stirred for 18 hours at room temperature and then the solvent is removed in vacuo. The concentrate is dissolved in water, extracted with ether, and aqueous phase separated. The aqueous phase is acidified to pH 1 with 4N sulfuric acid and extracted 3x with ether. The ether extracts are combined, washed with water and brine, dried over calcium sulfate and ether removed in vacuo to give 210.2 g of 11-methoxy-3,7,11-trimethyl-cis-2, trans-4-dodecadienoic acid (V).

EXAMPLE 24

To 242.8 g (0.91 mole) of 11-methoxy-3,7,11-trimethyl-cis-2, 4-trans-dodecadienoic acid is added, under nitrogen, 1.7 g (0.015 mole) thiophenol. The mixture is heated at 100° until equilibrium is attained or about 1 hour. After cooling, 115 g of Soltrol 130 (high boiling hydrocarbon solvent) is added and the mixture distilled in vacuo at 3 mm to remove the Soltrol 130 and the thiophenol. The residue consists of 65% trans, trans and 35% cis, trans 11-methoxy-3,7,11-trimethyl-2,4-dodecadienoic acid.

To a solution of 242.5 g of the foregoing isomeric mixture in 860 g of ethyl ether is added dry ammonia gas at a rate to maintain saturation. After the mixture ceases to absorb ammonia, it is stirred under an ammonia atmosphere for 2 hours. The mixture is then filtered, the solid resuspended in fresh diethyl ether (500 g) and filtered again. Residual ether in the precipitate is removed at reduced pressure to yield 130 g (77.7%) of a white solid, the ammonium salt of 11-methoxy-3,7,11-trimethyl-trans-2, trans-4-dodecadienoic acid. The ethereal filtrates from above are combined, washed with 4N sulfuric acid, water and brine, dried over calcium sulfate and ether removed to give 116.3 g residue which consists essentially of the cis-2, trans-4 isomer which is recycled through the isomerization procedure to an equilibrium mixture.

EXAMPLE 25

To 310.35 g (1.30 moles) of 3,7,11-trimethyl-cis-2, trans-4-dodecadienoic acid is added 1.55 g (0.014 moles) of thiophenol and the mixture stirred and heated at 100° for 90 minutes. After cooling, 150 ml of Soltrol 130 is added and the mixture heated in vacuo to remove the Soltrol 130 and thiophenol together, b.p. 40°-60°/2 mm. The residue is a mixture of 65% trans, trans and 35% cis-2, trans-4 3,7,11-trimethyl-2,4-dodecadienoic acid.

EXAMPLE 26

To 236 g (0.83 mole) of the ammonium salt of 11-methoxy-3,7,11-trimethyl-trans-2, trans-4-dodecadienoic acid in 350 g of water is added 500 g of hexane with stirring and then 275 g of 4N sulfuric acid. After stirring for 15 minutes, the mixture is allowed to stand and then the organic layer is separated and washed with brine and dried by azeotropically distilling off the hexane at atmospheric pressure. The yield of dry 11-methoxy-3,7,11-trimethyl-trans-2, trans-4-dodecadienoic acid is quantitative.

EXAMPLE 27

To a solution of 268.2 g (1 mole) of 11-methoxy-3,7,11-trimethyl-trans-2, trans-4-dodecadienoic acid in 146 g (2 mole) of dimethylformamide is added 136.9 g (1.15 mole) of thionylchloride at such a rate that the reaction temperature does not exceed 35°. After the addition is complete, the reaction mixture is held at 35° for 50 minutes. Then 188 g of pentane is added followed by slow addition of 81.0 g (1.35 mole) of isopropanol. After 1 hour stirring, an additional 250 g of pentane is added followed by slow addition of 300 g of water with cooling. After cooling to room temperature, the upper phase is separated and washed with 2N sodium hydroxide, water and brine and dried over sodium sulfate. Filtration and removal of the solvent affords 277 g (89.2 percent yield) of isopropyl 11-methoxy-3,7,11-trimethyl-trans-2, trans-4-dodecadienoate.

EXAMPLE 28

To a solution of 85.38 g (0.357 mole) of 3,7,11-trimethyl-trans-2, trans-4-dodecadienoic acid in 52.2 g (0.715 mole) of dimethylformamide is added slowly 48.80 g (0.411 mole) of thionyl chloride at such a rate that the reaction temperature does not exceed 35°. After addition is completed, the reaction mixture is held at 35° for 50 minutes. Then, with stirring, 151 g of pentane is added and stirring continued for 15 minutes. The mixture is allowed to stand and the lower phase drained off. With stirring, 27.5 g (0.472 mole) of 2-propyn-1-ol is added slowly to the separated upper pentane phase. After addition is completed, the reaction mixture is stirred for 1 hour as it cools to ambient temperature. When the reaction is complete, the reaction mixture is washed with water, 2N sodium hydroxide, water and brine, dried over sodium sulfate and solvent removed to give 97.75 g (99 percent yield) of crude product containing 97.2% prop-2-ynyl 3,7,11-trimethyl-trans-2, trans-4-dodecadienoate.

EXAMPLE 29

To a solution of 134 g of 11-methoxy-3,7,11-trimethyl-trans-2, trans-4-dodecadienoic acid in 73 g of dimethylformamide, is added 68.5 g of thionyl chloride while maintaining temperature at 35° or lower. After 1 hour at 35°, the mixture is cooled and then 175 ml of pentane is added with stirring. After stirring well, the mixture is allowed to settle and the lower dimethylformamide phase drained off. Additional pentane (225 ml) is added to the upper phase which is cooled to 15°, and then 34 g (0.55 mole) of ethyl mercaptan is added carefully followed by careful addition of 44.3 ml (0.55 mole) pyridine in pentane while maintaining the temperature below 30°. After addition is complete, the reaction mixture is stirred 1 hour at room temperature and then water (about 300 g) is added. The phases are separated and the organic phase washed with 4N sulfuric acid, water, 2N sodium hydroxide, water until neutral and brine. Pentane solvent is evaporated off to give ethyl 11-methoxy-3,7,11-trimethyl-trans-2, trans-4-dodecadienethiolate.

EXAMPLE 30

To a solution of 197 g (0.83 mole) of ammonium salt of 3,7,11-trimethyl-trans-2, trans-4-dodecadienoic acid in 350 g of water is added 500 g of hexane. With stirring, there is added 275 g of 4N sulfuric acid and stirring continued 15 minutes after addition is completed. The mixture is allowed to separate and the organic phase is washed with brine and then dried azeotropically by distilling off the hexane at atmospheric pressure to yield 3,7,11-trimethyl-trans-2, trans-4-dodecadienoic acid in quantitative yield, m.p. 42°–44°.

What is claimed is:

1. A compound of the formula VI or VII:

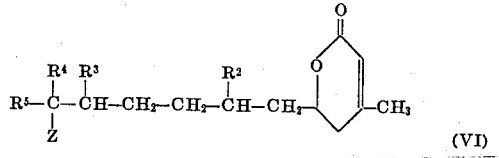

(VI)

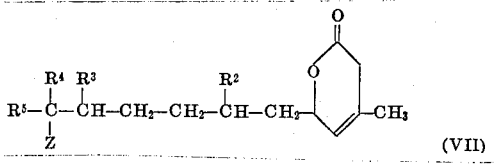

(VII)

wherein,
each of $R^2$, $R^4$ and $R^5$ is methyl or ethyl; $R^3$ is hydrogen or methyl; and Z is hydrogen, hydroxy or lower alkoxy.

2. A compound according to claim 1 wherein each of $R^2$, $R^4$ and $R^5$ is methyl and Z is hydrogen, hydroxy or methoxy.

3. A compound according to claim 2 wherein $R^3$ is hydrogen and Z is hydrogen.

4. A compound according to claim 2 wherein Z is methoxy and $R^3$ is hydrogen.

5. A compound according to claim 2 wherein Z is hydroxy and $R^3$ is hydrogen.

6. A compound of formula VI according to claim 3.

7. A compound of formula VI according to claim 4.

8. A compound of formula VII according to claim 3.

9. A compound of formula VII according to claim 4.

* * * * *